United States Patent [19]
Johnson

[11] Patent Number: 5,584,640
[45] Date of Patent: Dec. 17, 1996

[54] GRAIN TANK UNLOADING AUGER DRIVE MEANS

[75] Inventor: Vernon A. Johnson, Bloomington, Minn.

[73] Assignee: Eaton Corporation, Cleveland, Ohio

[21] Appl. No.: 230,272

[22] Filed: Apr. 20, 1994

[51] Int. Cl.$^6$ ..................................................... B60P 1/40
[52] U.S. Cl. ..................... 414/502; 414/526; 414/528; 60/425; 60/428; 198/575; 198/572; 198/577; 198/670; 198/810.01; 198/832
[58] Field of Search ........................... 198/579, 575, 198/571, 572, 573, 579, 674, 675, 676, 810.01, 832; 414/526, 502, 503, 504, 505, 326, 528, 319, 320, 321, 296; 60/420, 426, 427, 428, 429

[56] References Cited

U.S. PATENT DOCUMENTS

| | | | |
|---|---|---|---|
| 3,904,129 | 9/1975 | Lorenc | 414/502 X |
| 4,711,090 | 12/1987 | Hartiala et al. | 60/427 X |
| 4,717,308 | 1/1988 | Kuhns | 414/526 X |
| 5,228,558 | 7/1993 | Hall | 198/575 X |
| 5,333,997 | 8/1994 | Hormann et al. | 60/428 X |

FOREIGN PATENT DOCUMENTS

| | | | |
|---|---|---|---|
| 123532 | 9/1980 | Japan | 414/526 |
| 33538 | 2/1983 | Japan | 414/502 |
| 8704995 | 8/1987 | WIPO | 414/502 |

Primary Examiner—Frank E. Werner
Attorney, Agent, or Firm—L. J. Kasper

[57] ABSTRACT

A conveying system (43) is disclosed including a vertical auger (27) which receives material from a horizontal auger (25). The vertical auger is driven by a hydraulic motor (37) and the horizontal auger is driven by a hydraulic motor (35). A pressure response valve (89) responds to a pressure signal (93), representative of the load on the motor (37) driving the vertical auger to unload or bypass the motor (35) driving a horizontal auger. As the load on the vertical auger decreases, the valve (89) gradually communicates more flow to the motor (35) driving the horizontal auger, thus feeding more material (grain) to the vertical auger.

14 Claims, 3 Drawing Sheets

GRAIN TANK UNLOADING AUGER DRIVE MEANS

BACKGROUND OF THE DISCLOSURE

The present invention relates to drive systems for operating at least two hydraulically operated devices, and more particularly, to such systems wherein the load on one of the devices is a function of the rate of operation of the other device, or of the vehicle itself.

The present invention could be advantageously utilized in a number of applications, such as a street sweeper, on which one hydraulic motor drives a brush, which sweeps debris onto a conveyor, and the conveyor is driven by the other hydraulic motor. As used herein, and in the appended claims, the term "conveyor" will be understood to mean and include any sort of device, such as a flat-belt conveyor or auger, etc., which can convey or advance a quantity of material, wherein the quantity of material being conveyed determines the "load" on the conveyor. However, the present invention is especially advantageous when used in connection with an unloading auger drive system of a grain combine, and will be described in connection therewith. Unloading auger drive systems for grain combines are illustrated and described in U.S. Pat. Nos. 3,938,683; 3,938,684; and 4,037,745, all of which are incorporated herein by reference. In a typical grain combine, the grain being harvested is collected in a grain tank which must be periodically unloaded. The unloading auger drive system for such combines typically includes a horizontal auger disposed at or near the bottom of the grain tank which transports grain to the lower end of a vertical auger. The function of the horizontal auger is to keep the vertical auger full of grain. The upper end of the vertical auger is typically associated with an unloading auger, through which the grain is fed into a storage compartment of a transport vehicle, such as a truck.

In the typical, prior art, unloading auger drive system of the type illustrated in the above-cited patents, the various augers are normally interconnected by, and driven by, a fairly complex system of clutches, right angle gear boxes, sprockets, and chains. In one commercially available grain combine, the auger drive system is activated by a hydraulically operated cylinder, which applies tension to a belt drive arrangement which, in turn, drives the augers.

Although such auger drive systems have been generally satisfactory in operation, certain problems have persisted. For example, if all of the augers are full of grain, the resulting load on the drive system is excessive, and can stall the drive system. Another problem frequently encountered is damage to the grain when the auger is being driven while the grain is compacted and has nowhere to go. Finally, in order to deal with the problem of overloading of the auger drive system, some combine tanks have been provided with a system of adjustable slats in the bottom of the tank or hopper, which adds substantially to the cost and overall complexity of the combine.

Although it was indicated that operation of the prior art auger drive systems has been generally satisfactory, it has been observed that unloading the top one-half of the grain tank takes substantially less time than unloading the bottom one-half of the tank.

SUMMARY OF THE INVENTION

Accordingly, it is an object of the present invention to provide an improved unloading auger drive system which will overcome the above problems of the prior art drive systems.

It is a more specific object of the present invention to provide such an improved drive system which will relieve the load on the drive system when starting with the augers full, but which will also result in a more uniform rate of unloading.

It is another, and more general object of the present invention to provide an improved drive system for operating at least two hydraulically operated devices, wherein the load on one of the devices is a function of the rate of operation of the other device, or of the vehicle itself, in which the overall rate of operation of the drive system is nearly optimized.

The above and other objects of the invention are accomplished by the provision of an improved drive system for driving a first work device and a second work device, wherein the load on the first work device is a function of the rate of operation of the second work device. The improved drive system is characterized by a first hydraulic motor driving the first work device and having a fluid inlet port and a fluid outlet port, and a second hydraulic motor driving the second work device and having a fluid inlet port and a fluid outlet port. A source of pressurized fluid is in fluid communication with the fluid inlet port of the first hydraulic motor. A control valve means is provided and includes a fluid inlet in fluid communication with the fluid outlet port of the first hydraulic motor, a first fluid outlet in fluid communication with a system reservoir, and a second fluid outlet in fluid communication with the inlet port of the second hydraulic motor. The control valve means includes a valve member biased, by fluid pressure at the fluid inlet port of the first hydraulic motor, toward a first position permitting fluid communication from the inlet of the control valve means to the first fluid outlet. The control valve includes means operable to bias the valve member toward a second position permitting fluid communication from the fluid inlet of the control valve means to the second fluid outlet.

DESCRIPTION OF THE PREFERRED EMBODIMENT

Figure 1:
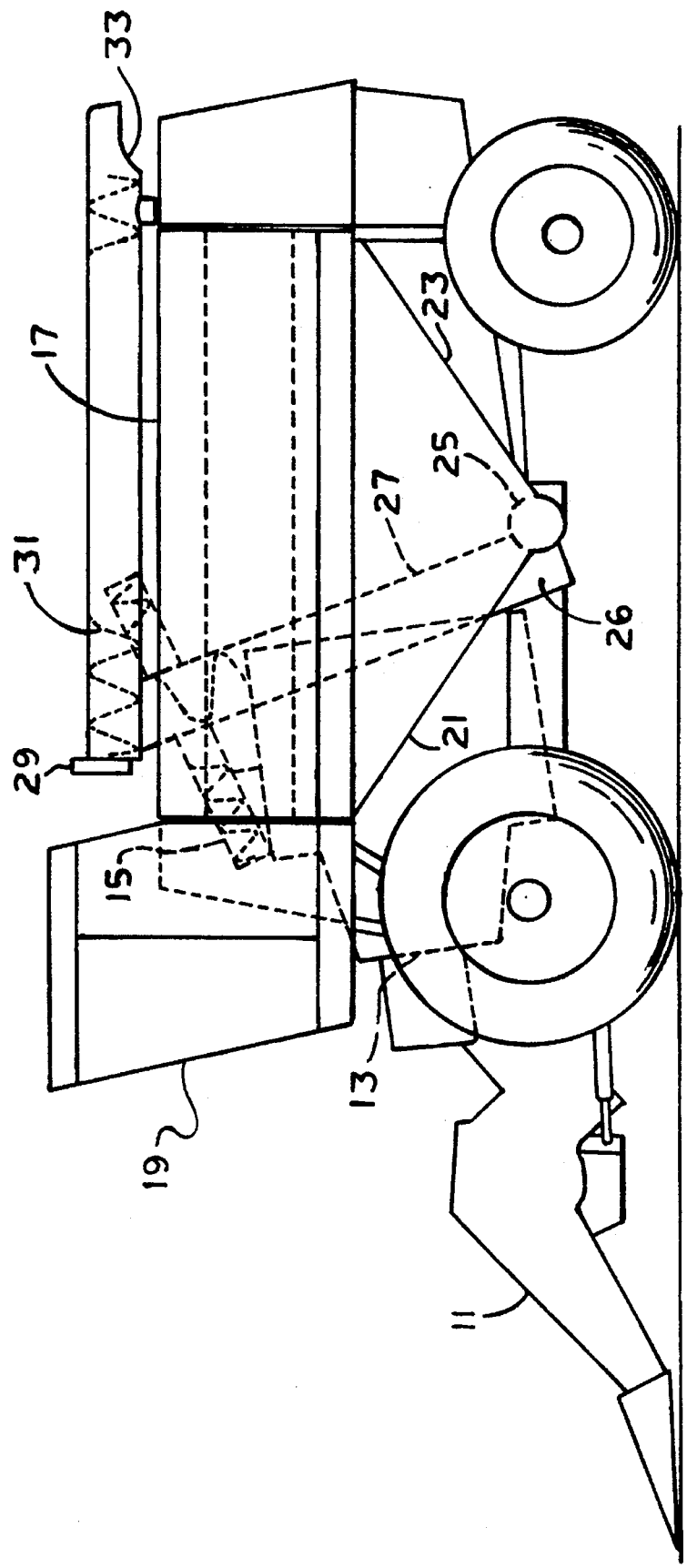
FIG. 1 is a side elevation of a grain combine embodying a grain tank unloading system of the type with which the present invention may be utilized.

Referring now to the drawings, which are not intended to limit the invention, FIG. 1 illustrates a self-propelled grain combine, which will be described only briefly herein in view of the above incorporation of U.S. Pat. No. 4,037,745. The combine includes a harvesting unit, such as a corn head 11, which gathers and delivers the grain to a grain processing unit 13. From the unit 13, the grain is delivered by means of a clean grain conveyor 15 to a grain tank 17. Typically, the grain tank 17 is disposed rearwardly (to the right in FIG. 1) of an operator's station 19.

The grain tank 17 includes a pair of floor sections 21 and 23 which converge downwardly and direct grain to a transverse (horizontal) auger conveyor 25 which is operable to deliver grain from the lower part of the tank 17 to an inlet portion 26 of an upright (vertical) auger conveyor 27.

After the grain is conveyed upwards by the vertical auger conveyor 27, it passes through a transition housing 29, and then flows into an unloading auger conveyor 31, which conveys the grain, then discharges it through an opening 33 at the rearward end of the conveyor 31.

Figure 2:
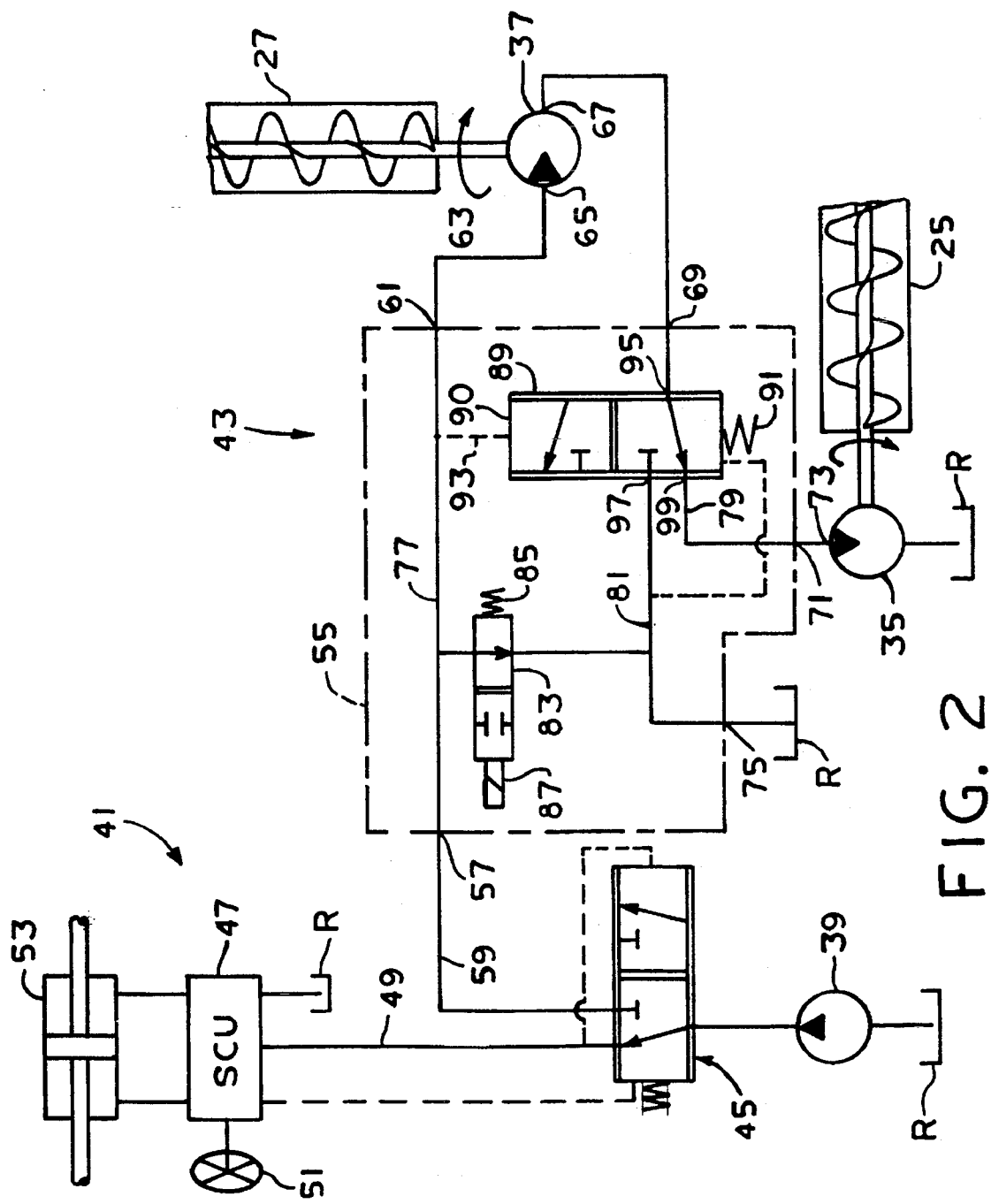
FIG. 2 is a hydraulic schematic of the drive system of the present invention.

Referring now primarily to FIG. 2, it should be noted that one important aspect of the present invention is that the auger conveyors 25 and 27 are not driven mechanically (i.e., by gear sets, sprockets and chains, etc.) as in the above-incorporated patents. Instead, it is an essential feature of the invention that the auger conveyors 25 and 27 are driven hydraulically.

Accordingly, the horizontal auger conveyor 25 is driven by a hydraulic motor 35, while the vertical auger conveyor 27 is driven by a hydraulic motor 37. Although not an essential feature of the invention, it is preferable that the hydraulic motors 35 and 37 comprise low-speed, high-torque ("LSHT") motors. More specifically, the LSHT motors 35 and 37 may comprise gerotor LSHT motors of the type sold commercially by the assignee of the present invention. It should be noted that the unloading auger conveyor 31 is preferably still driven by mechanical means (typically, off of the auger conveyor 27), and the conveyor 31 is not illustrated or described herein as part of the system of the present invention.

Preferably, both of the motors 35 and 37 are supplied with pressurized fluid from a single fluid source, such as a pump 39. In a typical vehicle installation, the pump 39 would supply hydraulic power (pressurized fluid) to several vehicle functions, although the invention is not so limited. In the subject embodiment, the pump 39 supplies pressurized fluid to a vehicle steering system, generally designated 41, and to an auger motor drive system, generally designated 43. The pump 39 supplies pressurized fluid to the vehicle steering system 41 and to the auger motor drive system 43 through a load sensing, priority flow control valve 45, of the type which is now well known to those skilled in the art, and is illustrated and described in U.S. Pat. No. 3,455,210, assigned to the assignee of the present invention and incorporated herein by reference. Various load sensing priority flow control systems are illustrated and described in greater detail in U.S. Pat. No. 4,043,419, also assigned to the assignee of the present invention and incorporated herein by reference.

As is well known to those skilled in the art, it is the function of the priority valve 45 to apportion flow of pressurized fluid between the vehicle steering system 41 and the auger motor drive system 43, giving "priority" to the vehicle steering system 41 (which is therefore also referred to as the "priority load circuit"). The vehicle steering system 41 includes a steering control unit ("SCU"), designated 47, which receives pressurized fluid from the pump 39 by means of the priority valve 45, through a conduit 49. In response to rotation of a steering wheel 51, the pressurized fluid in the conduit 49 is directed to one side or the other (as determined by the direction of rotation of the steering wheel 51) of a steering cylinder 53. The construction and operation of the vehicle steering system 41 is well known to those skilled in the art, is not an essential feature of the invention, and therefore will not be described further herein.

Preferably, the auger motor drive system 43 includes a valve block, generally designated 55, which may comprise a port block, mounted on the port face of the hydraulic motor 37. Schematically, the valve block 55 includes an inlet 57 which is connected to the auxiliary flow port of the priority valve 45 by means of a conduit 59 (and therefore, the drive system 43 is also referred to as the "auxiliary load circuit"). The valve block 55 also includes an outlet 61 which is connected by means of a conduit 63 to a fluid inlet port 65 of the motor 37. A fluid outlet port 67 of the motor 37 is connected to a second inlet 69 of the valve block 55, which also has a second outlet 71 connected to a fluid inlet port 73 of the motor 35. Finally, the valve block 55 includes a tank outlet 75, which is connected to a system tank or reservoir R.

Within the valve block 55, the inlet 57 and outlet 61 are interconnected by a passage 77 (shown schematically as a "conduit"). Similarly, there is a passage 79 leading to the second outlet 71, and a passage 81 leading to the tank outlet 75. Disposed within the valve block 55, and in parallel between the passages 77 and 81 is a two-position, two-way solenoid-operated valve 83. The valve 83 is biased by a spring 85 to the normally-open position shown in FIG. 2. In this position, substantially all pressurized fluid entering the inlet 57 is merely communicated through the valve 83 to the passage 81, and then out the tank outlet 75 to the system reservoir R, with no pressure available to operate either of the motors 35 or 37.

The valve 83 also includes a solenoid operator 87. When it is desired to operate the auger motor drive system 43, the vehicle operator energizes the solenoid operator 87, moving the valve 83 to a position blocking communication from the passage 77 to the passage 81, and thus maintaining pressurized fluid in the passage 77 and at the outlet 61.

Also disposed in the valve block 55 is a two-position, three-way pressure response valve 89, including a valve member 90, which is biased by a spring 91 to the position shown in FIG. 2. In opposition to the biasing force of the spring 91, the valve member 90 is biased by the fluid pressure in the passage 77, by means of a pressure signal 93. The valve 89 includes an inlet 95, a first outlet 97, connected to the passage 81, and a second outlet 99, connected to the passage 79. Those skilled in the art of hydraulic controls will understand that the valve 89 will normally modulate about a set point, as determined by the equivalent force of the spring 91.

Operation

As was described in the background of the disclosure, one of the problems with the prior art auger drive systems occurs upon start up, when the vertical auger 27 is full of grain. With the present invention, if the vertical auger 27 is full of grain upon start up, the motor 37 experiences a relatively high "starting torque", resulting in the build up of a relatively high pressure in the conduit 63 and the passage 77. Such high pressure is communicated by the pressure signal 93, biasing the valve member 90, in opposition to the force of the spring 91, to a position permitting substantially unrestricted communication from the inlet 95 to the first outlet 97. Thus, the motor 35 is "unloaded" (i.e., it receives no pressurized fluid) and substantially all available hydraulic power is available to drive the motor 37 and the vertical auger 27.

Those skilled in the art will understand that, although the auger motor drive system 43 may be operated "on-the-fly" (i.e., while the vehicle is moving), the vehicle is normally moving in a straight line while the auger system 43 is operating. Therefore, little if any fluid is being utilized by the vehicle steering system 41, and substantially the entire output of pressurized fluid from the pump 39 is available to the auger drive system 43.

As the vertical auger 27 transports some of the grain contained therein to the unloading auger conveyor 31, the volume of grain in the auger conveyor 27 decreases, and therefore, the torque on the motor 37 decreases, because the torque required to drive the vertical auger 27 is approximately proportional to the volume of grain in the auger. With the present invention, the total load pressures of the motors 35 and 37 together remains approximately constant, i.e., the sum of the product of the pressure drop across each motor and the flow therethrough is constant. It should be noted that, typically, the vertical auger is enclosed, such that the only grain in the auger 27 is that which is transported to it by means of the horizontal auger 25.

Thus, as the amount of grain in the vertical auger 27 drops, the pressure at the fluid inlet port 65 of the motor 37 also drops, as does the pressure signal 93. As the pressure signal 93 drops, the spring 91 biases the valve member 90 toward the position shown in FIG. 2, and the pressure response valve 89 begins to communicate some of the fluid from the fluid outlet port 67 of the motor 37 to the second outlet 99, from where it flows to the second outlet 71, and then to the fluid inlet port 73 of the motor 35. Therefore, as the amount of grain in the vertical auger 27 drops, the horizontal auger 25 begins to operate, and the arrangement is self-compensating in that, the less grain there is in the vertical auger 27, the more fluid will be directed to the motor 35, thus operating the motor 35 and horizontal auger 25 faster, increasing the amount of grain being fed into the vertical auger 27. Conversely, as the amount of grain in the vertical auger 27 again begins to increase, the pressure signal 93 increases, again moving the valve member 90 downward in FIG. 2, reducing the amount of fluid being directed to the motor 35, and therefore decreasing the amount of grain being fed by the horizontal auger 25 to the vertical auger 27.

Alternative Embodiments

As was mentioned in the background of the disclosure, the system of the present invention could be utilized in various other applications wherein the load on one work device is a function of the rate of operation of a second work device, or of the vehicle itself. One example of another application for the system of the invention that was mentioned in the BACKGROUND OF THE DISCLOSURE is a street sweeper, which typically includes a rotating brush which sweeps debris onto a conveyor, which then transports the debris up to a debris receptacle.

In the system as shown in FIG. 2, if applied to a typical street sweeper, the motor 35 would drive the rotating brush, while the motor 37 would drive the debris conveyor. If the amount of debris being transported by the conveyor begins to overload the motor 37, it is better, rather than permitting the vehicle engine to stall, to reduce the amount of debris being transported to the conveyor. This may be accomplished in either of two ways. First, the speed of movement of the sweeper itself may be reduced, or second, the flow to the motor 35 may be reduced, thus reducing the speed of operation of the rotating brush. If the first alternative is to be utilized, the flow from the second outlet 99 of the pressure response valve 89 may be used directly to drive the propel motor of the sweeper, or may be used to command displacement of a variable pump of a pump and motor propel system for the sweeper. Thus, the drive system of the present invention gives the conveyor priority over the brush, so that the brush doesn't overload the conveyor, and cause stalling of the overall drive system and the vehicle engine.

Figure 3:
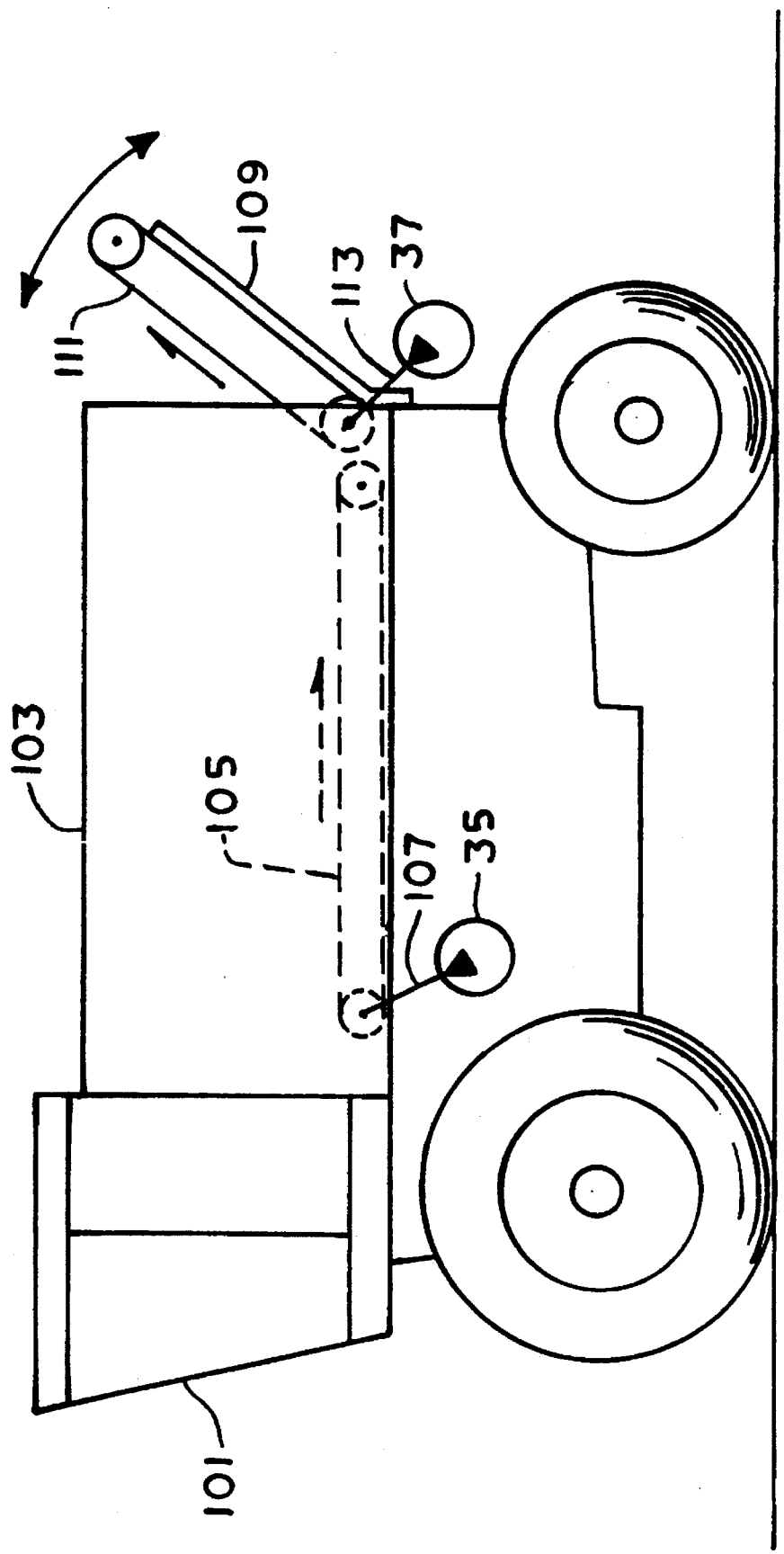
FIG. 3 is a side elevation, similar to FIG. 1, of a vehicle including an alternative embodiment of the drive system of the present invention.

Referring now primarily to FIG. 3, there is illustrated a further alternative embodiment of the present invention. FIG. 3 illustrates, generically, a vehicle including an operator station 101, and a material container 103. Disposed within the bottom of the material container 103 is a horizontal conveyor, generally designated 105, which is driven by the hydraulic motor 35. In FIG. 3, the hydraulic motor 35 is shown only schematically, and is shown driving the horizontal conveyor 105 by means of a drive shaft 107.

At the rearward end of the material container 103 is a door 109, which is hinged to move from a closed, perfectly vertical position (not shown) to the partially open position shown in FIG. 3. Operably associated with the door 109 is a vertical conveyor 111, the function of which is to receive material from the horizontal conveyor 105 and transport the material out of the container 103, typically into some other transport vehicle or another form of storage. In FIG. 3, the vertical conveyor 111 is driven by the hydraulic motor 37, which is shown only schematically in FIG. 3 and is shown driving the conveyor 111 by means of a drive shaft 113.

The operation of the drive system 43, as shown in FIG. 2, would be substantially the same in conjunction with the embodiment of FIG. 3 as it was in conjunction with the auger system of the FIG. 1 embodiment. In view of the angle of orientation of the vertical conveyor 111 in FIG. 3, it should be understood that the use herein of the term "vertical" is not limited to being perfectly vertical. Instead the term "vertical" as used herein merely requires that the device to which reference is made involves some vertical movement or elevation, such that the torque on the motor 37 will tend to be approximately proportional to the amount of material being transported by the vertical auger or vertical conveyor.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A drive system for driving a first conveyor subject to a load and a second conveyor operating at a particular rate, wherein the load on the first conveyor is a function of the rate of operation of the second conveyor; said drive system being characterized by:

(a) a first hydraulic motor driving said first conveyor and having a fluid inlet port and a fluid outlet port;

(b) a second hydraulic motor driving said second conveyor and having a fluid inlet port;

(c) a source of pressurized fluid in fluid communication with said fluid inlet port of said first hydraulic motor;

(d) control valve means including a fluid inlet in fluid communication with said fluid outlet port of said first hydraulic motor, a first fluid outlet in fluid communication with a system reservoir (R), and a second fluid outlet in fluid communication with said fluid inlet port of said second hydraulic motor;

(e) said control valve means including a valve member biased, by fluid pressure at said fluid inlet port of said first hydraulic motor, toward a first position permitting fluid communication from said fluid inlet of said control valve means to said first fluid outlet; and (f) means operable to bias said valve member toward a second position (FIG. 2) permitting fluid communication from said fluid inlet of said control valve means to said second fluid outlet; whereby an increasing load on the first conveyor is automatically compensated by a decreasing fluid flow to said second hydraulic motor.

2. A drive system as claimed in claim 1 characterized by said valve member, in said first position, substantially preventing fluid communication from said fluid inlet of said control valve means to said second fluid outlet.

3. A drive system as claimed in claim 1 characterized by said valve member, in said second position (FIG. 2), substantially preventing fluid communication from said fluid inlet of said control valve means to said first fluid outlet.

4. A drive system as claimed in claim 1 characterized by said first conveyor comprising a device adapted to move a quantity of material, said quantity of material being variable as a function of time; and said rate of operation of said second conveyor determining the quantity of material available to be moved by said first conveyor.

5. A drive system as claimed in claim 4 characterized by said first conveyor having an inlet portion, an outlet portion, and means operable to move said material from said inlet portion to said outlet portion; and said second conveyor being operable to move said material to said inlet portion of said first conveyor.

6. A drive system as claimed in claim 1 characterized by, in said first position of said valve member, substantially all fluid flowing through said first hydraulic motor flows to said system reservoir (R).

7. A drive system as claimed in claim 1 characterized by, in said second position of said valve member, substantially all fluid flowing through said first hydraulic motor flows to said second hydraulic motor.

8. A conveying system for conveying material from a container adapted to contain a quantity of said material; said conveying system including a vertical auger and means for driving said vertical auger, and further including a horizontal auger and means for driving said horizontal auger; said vertical auger including an inlet portion disposed toward a lower portion of said container, and an outlet portion disposed toward an upper portion of said container, said horizontal auger being disposed to move said material to said inlet portion of said vertical auger; said conveying system being characterized by:

(a) a first hydraulic motor comprising said means for driving said vertical auger;

(b) a second hydraulic motor comprising said means for driving said horizontal auger;

(c) a first source of pressurized fluid for said first hydraulic motor, and a second source of pressurized fluid for said second hydraulic motor;

(d) control valve means including a fluid inlet in fluid communication with said first hydraulic motor, a first fluid outlet in fluid communication with the system reservoir, and a second fluid outlet in fluid communication with said second hydraulic motor;

(e) said control valve means including a valve member biased by fluid pressure at said first hydraulic motor, toward a first position permitting fluid communication from said fluid inlet of said control valve means to said first fluid outlet; and (f) means operable to bias said valve member toward a second position permitting fluid communication from said fluid inlet of said control valve means to said second fluid outlet, whereby an increasing load on said vertical auger is compensated for by a decreasing flow of fluid to said second hydraulic motor.

9. A drive system as claimed in claim 8 characterized by the total load pressures of said first and second hydraulic motors remains approximately constant.

10. A drive system as claimed in claim 8 characterized by said first hydraulic motor having a fluid inlet port and a fluid outlet port, said fluid outlet port of said first hydraulic motor comprising said second source of pressurized fluid for said second hydraulic motor.

11. A drive system as claimed in claim 10 characterized by said control valve means comprises said control valve means disposed in series flow relationship between said fluid outlet port of said first hydraulic motor and said second hydraulic motor.

12. A drive system as claimed in claim 8 characterized by said control valve means being operable to control fluid flow to said second hydraulic motor as a function of the fluid pressure from said first source of pressurized fluid, with a decrease in the fluid pressure from said first source resulting in an increase in fluid flow to said second hydraulic motor.

13. A drive system as claimed in claim 8 characterized by said control valve means being operable to control fluid flow to said second hydraulic motor as a function of the fluid pressure from said first source of pressurized fluid, with an increase in the fluid pressure from said first source resulting in a decrease in fluid flow to said second hydraulic motor.

14. A drive system for use on a vehicle for driving a first conveyor subject to a load and a second conveyor operating at a particular rate, wherein the load on the first conveyor is a function of the rate of operation of at least one of the vehicle and the second conveyor; said drive system being characterized by:

(a) a first hydraulic motor driving said first conveyor and having a fluid inlet port and a fluid outlet port;

(b) a source of pressurized fluid in fluid communication with said fluid inlet port of said first hydraulic motor;

(c) control valve means including a fluid inlet in fluid communication with said fluid outlet port of said first hydraulic motor, a first fluid outlet in fluid communication with a system reservoir (R), and a second fluid outlet;

(d) said control valve means including a valve member biased, by fluid pressure at said fluid inlet port of said first hydraulic motor, toward a first position permitting fluid communication from said fluid inlet of said control valve means to said first fluid outlet;

(e) means operable to bias said valve member toward a second position (FIG. 2) permitting fluid communication from said fluid inlet of said control valve means to said second fluid outlet; and (f) said second fluid outlet is in fluid communication with a means operable to control said rate of operation of said one of the vehicle and the second conveyor, whereby an increasing load on said first conveyor is compensated by a decreasing fluid flow to said second fluid outlet.

* * * * *